Aug. 2, 1960
A. W. VANCE
2,947,474
COMPUTING SYSTEMS
Filed Dec. 30, 1944
3 Sheets-Sheet 1
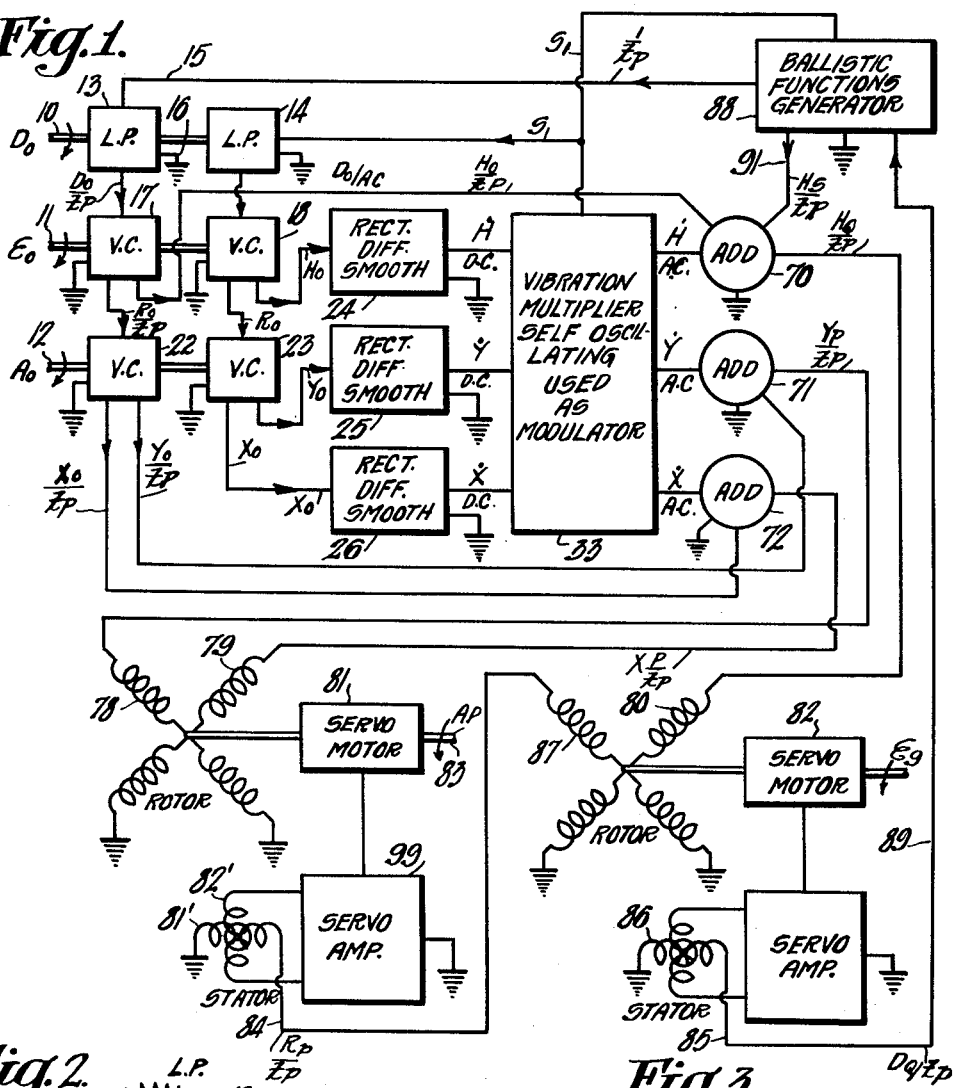
INVENTOR.
*Arthur W. Vance*
BY
*C D Tuska*
ATTORNEY

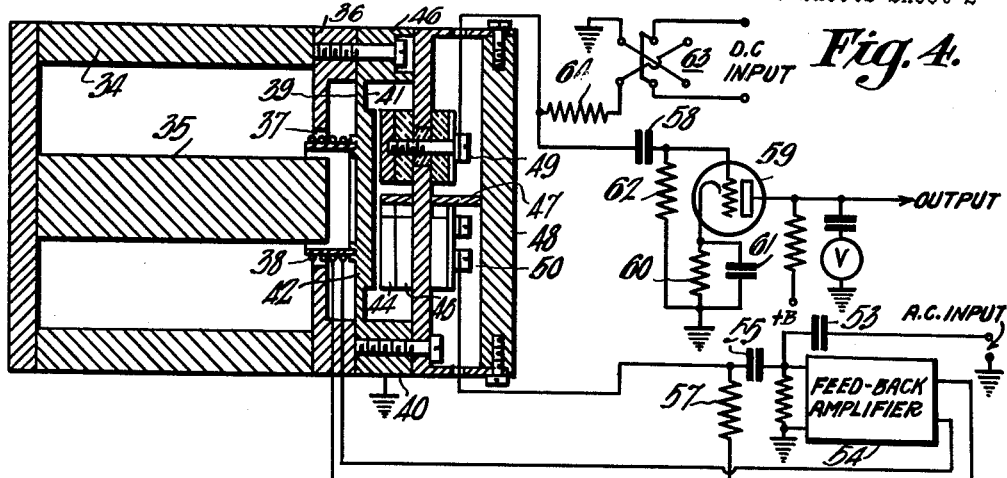

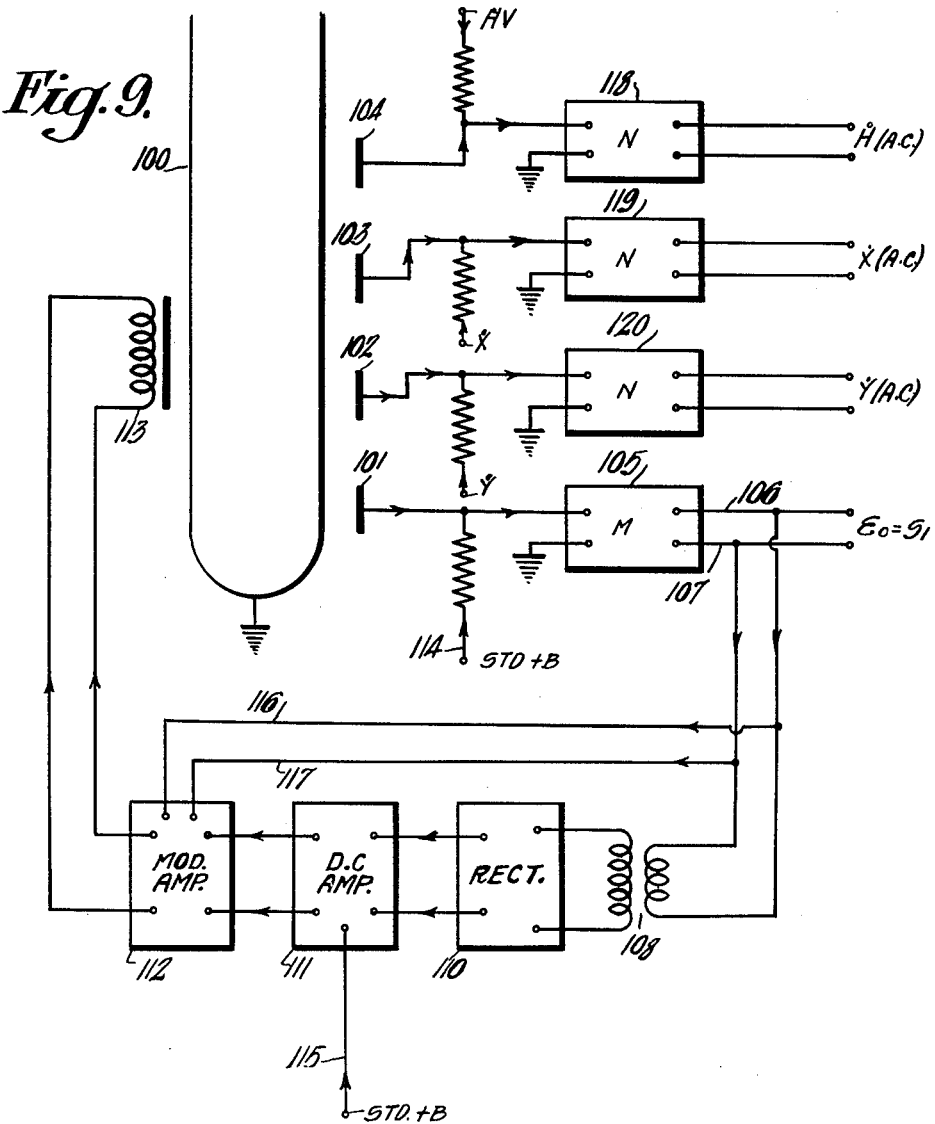

United States Patent Office 2,947,474
Patented Aug. 2, 1960

2,947,474

COMPUTING SYSTEMS

Arthur W. Vance, Cranbury, N.J., assignor, by mesne assignments, to the United States of America as represented by the Secretary of the Army Filed Dec. 30, 1944, Ser. No. 570,524

9 Claims. (Cl. 235—61.5)

This invention relates to computing systems such as are adapted to the fire control of anti-aircraft guns, or the like, and has for its principal object the provision of an improved computing system and method of operation whereby the requirement of fuse data is obviated.

Successful aiming of anti-aircraft guns requires the rapid, accurate carrying out of a number of rather complicated mathematical operations. For this purpose, different types of computing systems are available. The mechanical type of computing system has been widely used but leaves something to be desired with respect to speed, accuracy and the possibility of utilizing quantity production methods in its manufacture. The electronic type of computing system is made possible by recent advances in the techniques of manufacturing and operating electrical and electronic equipment which is suitable for performing most or all of the required computing operations.

The most immediate advantages realized from the employment of the electronic type of computing equipment are that it lends itself readily to quantity production, it operates with relatively high speed and great accuracy due to the absence of the inertia associated with moving parts, its probable life is relatively long and its maintenance is relatively simple.

The fundamental problem in predictions for use with anti-aircraft guns is the rapid and accurate calculation of the future position of the target from the tracking data and the firing data for the gun. The tracking data (present slant range $D_0$, present azimuth $A_0$ and present elevation $E_0$) is usually available in the form of mechanical rotation. In the present system, as in some previous systems of a similar type, such data is applied to the shafts of three different vario-couplers which form a part of the system through which the tracking data is converted to future azimuth $A_p$ and future elevation $E_g$. These quantities $A_p$ and $E_g$ are made available in the form of mechanical rotation at the shafts of separate servo motors which function to control pointing of the gun.

In order to cause such systems to converge to the desired solution there is provided a feedback loop which includes a ballistic function generator. Under all normal conditions, the regeneration in this loop causes the various potentials of the system to vary to a converging solution so that the loop is self balancing. Otherwise stated, regeneration in the loop produces potentials which converge to a solution in which the values $D_q$ (future slant range) and $t_p$ (time of flight) satisfy the function established by the ballistic function generator.

Distinguishing characteristics of the present system are (1) values of $1/t_p$ instead of $t_p$ are fed back over the feedback loop, (2) the prediction problem is solved in linear coordinate velocities instead of distances and (3) instead of multiplying the linear rates by $t_p$ to obtain lead distances, the present positions are divided by $t_p$ and these velocities are added directly to the rates to obtain $$\frac{H_p}{t_p} = \left(\frac{H_0}{t_p} + \dot{H}\right)$$

$$\frac{Y_p}{t_p} = \left(\frac{Y_0}{t_p} + \dot{Y}\right)$$

and $$\frac{X_p}{t_p} = \left(\frac{X_0}{t_p} + \dot{X}\right)$$

The significance of these various symbols and of others which follow is readily ascertained from the following explanatory tabulation:

$D_0$ = present slant range
$D_q$ = future slant range
$H_0$ = present height
$H_p$ = future height
$Y_0$ and $X_0$ = present ground distances in linear coordinates
$Y_p$ and $X_p$ = future ground distances in linear coordinates
$R_0$ = present ground range of target
$R_p$ = future ground range of target
$H_s$ = super height (distance above target gun must be pointed to hit target i.e. the gun is pointed at the future virtual position of the target)
$H_s/t_p$ = the negative of the average rate of fall of the projectile due to gravity.

$$Hq = H_s + H_p$$

$$Dq = \sqrt{R_p^2 + H_p^2}$$

$$\dot{H} = \frac{dH_0}{dt}, \ \dot{X} = \frac{dX_0}{dt} \text{ and } \dot{Y} = \frac{dY_0}{dt}$$

The linear velocities $H_p/t_p$, $Y_p/t_p$, and $X_p/t_p$, previously mentioned, are resolved into future angles by means including vario coupler servos. In accordance with the present invention, such vario couplers are provided with additional windings through which values of $D_q/t_p$ are generated and applied to a ballistic functions generator which generates the ballistic functions $1/t_p$ and $H_s/t_p$. Other features of the invention will become apparent as the improved computing system is considered in greater detail.

Additional objects of the invention are the provision of an improved and simplified computing system; and the provision of a gun fire control system which does not utilize the time of flight ($t_p$) as a multiplier and operates with more constant sensitivity due to the more restricted range thus made possible.

The invention will be better understood from the following description considered in connection with the accompanying drawings, and its scope is indicated by the appended claims.

Referring to the drawings,

Figure 1 illustrates the complete computing system, some of the various elements being shown as blocks and others as wiring connections, Figure 2 is a wiring diagram of a potentiometer which is operated in response to values of the present slant range ($D_0$), Figure 3 is a wiring diagram of a vario coupler, Figures 4 and 5 illustrate a modulator which forms a part of the system, Figure 6 is a wiring diagram of a rectifying differentiating and smoothing circuit, Figure 7 is an adding circuit, Figure 8 is a wiring diagram of a function generator, and Figure 9 illustrates a modified form of modulator.

To the various parts of the system of Fig. 1 are applied explanatory legends indicating the functions performed by these parts. Thus the legend L.P. denotes linear potentiometer, V.C. denotes vario coupler, D.-C. placed near a symbol of a quantity indicates that the quantity involved is in the form of a direct current having an amplitude proportional to the successive values of that particular quantity and A.-C. placed near a symbol of a quantity indicates that the quantity involved is in the form of a constant frequency alternating current of an amplitude proportional to the successive values of that particular quantity. The meanings of the symbols used to designate the various values involved in the calculation are set forth in the preceding tabulation. Other legends of Fig. 1 are self-explanatory. Where parts are shown as blocks, their electrical connections are shown in subsequent figures of the drawings.

As previously indicated, the values of the continuously variable quantities $D_0$ (present slant range), $E_0$ (present elevation) and $A_0$ (present azimuth) are assumed to be available at the shafts 10, 11 and 12 in the form of mechanical rotation.

Associated with the shaft 10 are linear potentiometers 13 and 14. The electrical connections of these potentiometers are illustrated by Fig. 2. Between the terminals 15 and 16 of the potentiometer 13 is applied an electrical potential of an amplitude proportional to the value of the reciprocal of the time of flight ($1/t_p$). The output the potentiometer is the quantity $D_0/t_p$, i.e., the present slant range divided by the time of flight.

Between the input terminals of the potentiometer 14 is applied an alternating current signal $S_1$. The output of the potentiometer 14 is an alternating current proportional to the quantity $D_0$.

Upon the shaft 11 are mounted two vario couplers 17 and 18 having the electrical connections indicated by Fig. 3. To the input winding 19 of the vario coupler 18 is applied an alternating potential of an amplitude proportional to $D_0$. From the output windings 20 and 21 of this vario coupler are derived alternating potentials of amplitudes proportional to $H_0$ ($Do \sin Eo$) and $Ro$ ($Do \cos Eo$), respectively.

To the input winding of the vario coupler 17 is applied an alternating potential of an amplitude proportional to the value of $Do/t_p$ and from its output windings are derived alternating potentials of amplitudes proportional to the values of $Ro/t_p$ and $Ho/t_p$, respectively.

Mounted on the shaft 12 are two vario couplers 22 and 23 which are similar to the vario couplers 17 and 18. To the input winding of the vario coupler 22 is applied an alternating potential of an amplitude proportional to the value of the quantity $Ro/t_p$ and from its output windings are derived alternating potentials proportional to the values of the quantities $Yo/t_p$ and $Xo/t_p$, respectively.

To the input winding of the vario coupler 23 is applied an alternating potential of an amplitude proportional to the value of the quantity $Ro$ and from its output windings are derived alternating potentials proportional to the values of the quantities $Xo$ and $Yo$, respectively.

The alternating potentials having amplitudes representative of the values of the quantities $Ho$, $Yo$ and $Xo$ are applied to the input terminals of the rectifying, differentiating and smoothing circuits 24, 25 and 26. The electrical connections of these circuits are shown by Fig. 6. Each of them includes an input transformer 27, an amplifier 28, a rectifier 29, a differentiating network 30—31 and a smoothing network 32. From these three circuits are derived unidirectional potentials proportional to $\dot{H}$, $\dot{Y}$ and $\dot{X}$.

These unidirectional potentials are converted to corresponding alternating potentials by a modulator 33 which may be of the type disclosed in Patent No. 2,401,-527, issued June 4, 1946 to this applicant, or of the type disclosed in a copending application Serial No. 565,695, filed November 29, 1944, now Patent No. 2,469,264.

The details of the first type of modulator are illustrated by Figs. 4 and 5 of the present application. The details of the last type of modulator are illustrated in Fig. 9.

The first type of modulator includes a magnet 34—35 having an annular pole piece 36. The annular pole piece and the inner element 35 include an air gap 37 in which is disposed an electrodynamic driving coil 38. The driving coil 38 is mounted rigidly upon a conductive diaphragm 39 having an outer annular portion 40 rigidly mounted upon the magnetic structure 34. The diaphragm 39 includes a relatively thin annular portion 41 and a relatively heavy circular center portion 42. A plurality of fixed conductive elements 43, 44 are supported by insulating members 45 on a frame member 46 which is supported rigidly by the magnetic structure 34.

Shielding members 47, normal to the supporting member 46 and the diaphragm 39 are disposed between the several fixed capacitive elements 43, 44, respectively. The fixed capacitive elements are disposed substantially parallel to the center circular portion 42 of the diaphragm 39 and are spaced therefrom a distance of the order of .004 inch. The supporting member 46 may include a suitable cover 48 attached thereto for completing the shielding of the fixed capacitive elements 43, 44 and the terminals 49, 50, respectively connected thereto. The diaphragm 39 is preferably grounded on the supporting structure 34, 46. Suitable apertures are provided in the supporting member 45 for making electrical connections to the terminals 49, 50.

An A.-C. potential of constant amplitude is applied through a coupling capacitor 53 to the input of a feedback thermionic tube amplifier 54. The terminal 50 connected to the fixed capacitive element 44 is connected through a second coupling capacitor 55 to the input of the feedback amplifier 54. The remaining terminal of the feedback amplifier input is connected to ground. The output of the feedback amplifier 54 is connected to the terminals of the driving coil 38 of the device. The negative terminal of a source of reference potential, such as a battery 56, is connected to ground. The positive terminal thereof is connected through a high resistance 57 to the terminal 50 of the fixed capacitive element 44.

The terminal 49 of the fixed capacitive elements 43 is connected through a third coupling capacitor 58 to the control electrode of an amplifying thermionic tube 59. The cathode circuit of the amplifier tube 59 includes a conventional cathode resistor 60 and cathode capacitor 61. A high resistance 62 is connected between the control electrode of the amplifier tube 59 and ground.

A D.-C. potential, of amplitude proportional to the value of the quantity $\dot{H}$, $\dot{Y}$, or $\dot{X}$ is applied to the movable element of a reversing switch 63. One of the fixed contacts of the reversing switch 63 is connected to ground. The other fixed contact is connected through a high resistance coupling resistor 64 to the terminal 49 of the fixed capacitive element 43. The anode of the amplifier tube 59 is connected to any desired utilization circuit, and to a source of operating potential not shown.

Any A.-C. potentials occurring in the anode circuit of the amplifier tube 59 will be proportional to the product of the amplitudes of the applied A.-C. and D.-C. potentials. Since the amplitude of the A.-C. potential is constant, the output potential is an A.-C. potential of an amplitude proportional to the value of the quantity $\dot{H}$, $\dot{X}$ or $\dot{Y}$, as indicated by the legends of Fig. 1 wherein the modulator is shown as a box designated by the numeral 33.

The operation of the feedback amplifier circuit is, of course, similar to that employed in conventional electroacoustic circuits whereby non-linearity of vibration of the diaphragm 39 provides compensating potentials which vary the gain of the feedback amplifier, thereby correcting for such non-linearity.

Fig. 5 illustrates a modified modulator which employs four segmental fixed capacitive electrodes 43, 44, 43' and 44', as well as the shielding elements 47, 47', and which employs three amplifiers instead of two as shown in Fig. 4.

The outer heavy portion 40 of the diagraph is connected to ground. The terminal 49 of the first fixed capacitive element 43 is connected to one of the input terminals of the first amplifier 59. The remaining input terminal of the amplifier 59 is grounded. A first source of D.-C. input is connected as described heretofore to the terminal 49 of the first segmental fixed capacitive electrode 43, and to ground.

The A.-C. output of the first amplifier 59 will be proportional to the product of the amplitudes of the first D.-C. input and the A.-C. input as described heretofore. The second and fourth segmental fixed capacitive electrodes 44, 44' are connected together and connected to one of the input terminals of the feedback amplifier 54. The output of the feedback amplifier 54 is connected to the driving coil 38 as described heretofore. The terminal 51 of the third segmental fixed capacitive electrode 43' is connected to one of the input terminals of a second amplifier 69 through a coupling capacitor 68 in the same manner as described heretofore for the first multiplier amplifier 59. Similarly, the remaining input terminal of the second amplifier 69 is grounded, and a second D.-C. voltage amplitude proportional to the value of $\dot{H}$, $\dot{X}$ or $\dot{Y}$ is applied to the third capacitive electrode 43' and the diaphragm 39. The A.-C. output of the second multiplier amplifier 69 will therefore be proportional to the value of the quantity $\dot{H}$, $\dot{X}$ or $\dot{Y}$, as the case may be.

The modulator of Fig. 9 is disclosed and claimed in a copending application of E. A. Goldberg Ser. No. 565,695, filed Nov. 29, 1944, now Patent No. 2,469,264. It includes a magnetically driven tuning fork 100 provided with electrostatic pick-ups 101 to 104. The pick-up 101 functions as a part of a signal generator. The pick-ups 102 to 104 function through separate amplifiers 118, 119 and 120 each in response to a separate unidirectional voltage $\dot{H}$, $\dot{X}$ or $\dot{Y}$ to produce an alternating voltage $\dot{H}$ (A.-C.), $\dot{X}$ (A.-C.) or $\dot{Y}$ (A.-C.) which is proportional in amplitude to the corresponding unidirectional voltage.

The signal generator includes the pick-up 101, a feedback amplifier 105 having output leads 106—107, a transformer 108, a rectifier 110, a direct current amplifier 111, a modulator and amplifier 112 and a driving coil 113 for the fork 100. Standard unidirectional voltages are applied to the terminals 114 and 115. A connection 116—117 is provided between the output terminals 106—107 and the modulator of the modulator and amplifier 112. Available at the output terminals 106 and 107 of the generator is an alternating signal $S_1$, of an amplitude dependent on the amplitude of the unidirectional voltage applied to terminal 114. As indicated by Figs. 1 and 8 this signal $S_1$ is applied to the linear potentiometer 14 and to the ballistic functions generator 88.

Assuming the fork 100 to be vibrating and a unidirectional voltage to be applied to the terminal 115, an alternating current of the fork frequency flows into the feedback amplifier 105. The output voltage of the feedback amplifier 105 is stepped up by the transformer 108, is rectified by the rectifier 110 and compared with the unidirectional voltage applied to the terminal 115. The difference between the two unidirectional voltages is impressed on the input of the direct current amplifier 111 and the output of this amplifier is used to control the gain of the modulator section of the modulator amplifier 112 which is excited from the feedback amplifier and functions through an amplifier section to drive the fork 100. This modulator operates so that the rectified output voltage approaches very closely the unidirectional voltage applied to the terminal 115.

In the operation of the system of Fig. 9, the voltage of the terminal 115 is adjusted to produce the desired signal generator output voltage and the voltage of the terminal 114, is adjusted thereafter to the value which gives the proper vibration amplitude of the tuning fork. For additional details of this type of modulator, reference may be had to the aforesaid copending application of Goldberg.

The unidirectional potentials having amplitudes proportional to the values of the quantities $\dot{H}$, $\dot{X}$ and $\dot{Y}$, respectively, are thus readily converted to corresponding alternating potentials either by three modulators similar to that of Fig. 4, by a single modulator similar to that of Fig. 5 provided with the proper number of fixed capacitive elements, or by a modulator similar to that of Fig. 9.

These alternating potentials having amplitudes proportional to the values of the quantities $\dot{H}$, $\dot{X}$ and $\dot{Y}$ are applied to the adding circuits 70, 71 and 72. The electrical connections of these adding circuits are indicated by Fig. 7. They include one set of input terminals 73—74 to which is applied the alternating potential having an amplitude proportional to $\dot{H}$, $\dot{X}$ or $\dot{Y}$ and another set of input terminals 75—76 to which is applied an alternating potential having an amplitude proportional to the value of the quantity $Hs/t_p$ and $Ho/t_p$, $Yo/t_p$ or $Xo/t_p$. From the output terminal 77 of the circuits 70, 71 and 72 is derived an alternating potential of an amplitude proportional to the value of the quantity $Hq/t_p$, $Yp/t_p$ or $Xp/t_p$, respectively. These linear velocities are resolved into future angles by means of vario coupled servos which control pointing of the gun.

Thus the potentials representative of the quantities $Xp/t_p$ and $Yp/t_p$ are applied to the vario coupler windings 79 and 78 and the potential representative of $Hq/t_p$ is applied to the winding 80 of a separate vario coupler. As is usual in systems of this type, values of $Ap$ and $Eg$ are available in the form of mechanical rotation at the shafts of servo motors associated with these two vario couplers.

Such vario coupler resolver servo devices have been used to resolve $Xp$ and $Yp$ into $\tan^{-1} Yp/Xp$. If the vario coupler so used is provided with an extra stator winding 81' wound perpendicular to the winding 82' used by the servo system, its axis will be maintained in line with the resultant field set up by $Xp$ and $Yp$, and it will pick up a voltage proportional to their vector sum or $Rp$. Thus with potentials representative of $Xp/t_p$ and $Yp/t_p$ impressed on the rotor windings 79 and 78, $Ap$ is made available at the shaft 83 and a potential representative of $Rp/t_p$ is made available at the lead 84 of the winding 81'.

Similarly, a potential representative of $Dq/t_p$ is derived from the terminal 85 of the additional stator winding 86 of the other vario coupler when potentials representative $Hq/t_p$ and $Rp/t_p$ are applied to its rotor windings 80 and 87.

The ballistic functions $1/t_p$ and $Hs/t_p$ are derived from a generator 88 which is connected in the feedback loop 89—15—91 previously discussed and is excited by a potential representative of the quantity $Dq/t_p$. This generator applies through the lead 15 to the linear potentiometer 13 a potential representative of $1/t_p$ and through the lead 91 to the adding network 70 a potential representative of $Hs/t_p$. How these two potentials are combined with the various other potentials of the system to control pointing of the gun is apparent from the previous explanation.

The generator 88 may be of any suitable type such as that illustrated by Fig. 8. As illustrated, this generator is in the form of a linear servo driven by a potential representative of $Dq/t_p$ and actuating non-linear potentiometers excited by the signal generator. Thus the driving potential is applied through a transformer 92, a voltage amplifier 93 and a power amplifier 94 to a motor 95 which actuates three potentiometers 96, 97 and 98 to which potential is also applied from the signal generator. Potentiometer 96 is a linearly wound potentiometer and the voltage $Dq/t_p$ is applied to it through the moving contact of the potentiometer to oppose the standard voltage $S_1$. The motor accordingly rotates and turns the potentiometer moving arm until the voltage $Dq/t_p$ is balanced out by a portion of the voltage $S_1$. Since $S_1$ is a standard and unvarying voltage the angle of rotation of the motor is directly proportional to $Dq/t_p$. Information as to the variations in the times of flight, $t_p$, for variations in slant range are usually made available in the form of tables with all types of artillery. Otherwise, this information may be readily determined experimentally, and from this information there may be readily computed the taper required for the winding of potentiometer 97 to provide a voltage $1/t_p$ which varies in accordance with rotation of its movable contact in proportion to the value of the voltage $Dq/t_p$. Similarly the super height, $Hs$, for various slant ranges, is provided or may be obtained experimentally. The taper required for the winding of potentiometer 98, to provide a voltage $Hs/t_p$ which varies in accordance with rotation of its movable contact in proportion to the value of the voltage $Dp/t_p$ is then readily determined. Potentials representative of $1/t_p$ and $Hs/t_p$ are thus made available at the leads 90 and 91 as previously indicated.

The big advantage of the new system is the elimination of the time of flight multiplier as such. The multiplication process is thus reduced to the relatively simple process of exciting a potentiometer on the $Do$ shaft 10. Another advantage is that $Dq/t_p$ and $Rp/t_p$ are more easily resolved than $Dq$ and $Rp$ since they vary over a more restricted range and the servos tend to hold more constant sensitivity as the range varies. This is particularly true of $Dq/t_p$.

If the sensitivity of the $Ap$ servo amplifier 99 is controlled as the cosecant of $Eg$, then the servo sensitivities become nearly alike as a function of range. This result is readily accomplished by making the amplifier 99 a feedback amplifier and inserting a cos $Eg$ coupler in the feedback path. Other modifications of the illustrated form of the invention without surrendering the advantages set forth above will be apparent to those skilled in the art.

What is claimed is:

1. In a method of directing a projectile from a gun to a moving target, the steps which include generating potentials representative of ballistic functions which are defined as the reciprocal of the time of flight of said projectile and the product of said reciprocal and the distance above the target said gun must be pointed to compensate for the fall of said projectile due to gravity, generating a first group of potentials representative of the present position of the target in linear coordinates, generating a second group of potentials representative of the derivatives of said first group of potentials, generating a third group of potentials representative of the product of each of said first group of potentials and said potential representative of said reciprocal of the time of flight, combining said second and third groups of potenitals to derive a fourth group of potentials representative of the product of said reciprocal and the future position of said target, combining the ground components of said fourth group of potentials in a vector quadrature relation to derive a potential representative of the product of said reciprocal and the future ground range of said target, combining the vertical component of said fourth group of potentials with a potential representative of the product of said reciprocal and the ballistic function potential representative of the distance above said target said gun must be pointed to compensate for the effect of gravity on said projectile to derive a potential representative of the product of said reciprocal and the virtual height of said target, and combining said last derived potential in vector quadrature with the potential representative of the product of said reciprocal and the future ground range to derive a potential representative of the product of said reciprocal and the slant distance from the gun to the future virtual position of said target.

2. In a method of directing a projectile from a gun to a moving target, the steps which include generating potentials representative of ballistic functions which are defined as the reciprocal of the time of flight of said projectile and the product of said reciprocal and the distance above the target said gun must be pointed to compensate for the fall of said projectile due to gravity, generating a first group of potentials representative of the present position of the target in linear coordinates, generating a second group of potentials representative of the derivatives of said first group of potentials, generating a third group of potentials representative of the product of each of the first group of potentials and said potential representative of said reciprocal of the time of flight, combining said second and third groups of potentials to derive a fourth group of potentials representative of the product of said reciprocal and the future position of said target, combining the ground components of said fourth group of potentials in a vector quadrature relation to derive a potential representative of the product of said reciprocal and the future ground range of said target, combining the vertical component of said fourth group of potentials with a potential representative of the product of said reciprocal and the ballistic function potential representative of the distance above said target said gun must be pointed to compensate for the effect of gravity on said projectile to derive a potential representative of the product of said reciprocal and the virtual height of said target, and combining said last derived potential in vector quadrature with the potential representative of the product of said reciprocal and the future ground range to derive a potential representative of the product of said reciprocal and the slant distance from the gun to the future virtual position of said target and utilizing said last potential to control the generation of said ballistic function representative potentials.

3. In a method of directing a projectile from a gun to a moving target, the steps which include generating potentials representative of ballistic functions which are defined as the reciprocal of the time of flight of said projectile and the product of said reciprocal and the distance above the target said gun must be pointed to compensate for the fall of said projectile due to gravity, generating a first group of potentials representative of the present position of the target in linear coordinates, generating a second group of potentials representative of the derivatives of said first group of potentials, generating a third group of potentials representative of the product of each of the first group of potentials and said potential representative of said reciprocal of the time of flight, combining said second and third groups of potentials to derive a fourth group of potentials representative of the product of said reciprocal and the future position of said target, combining the ground components of said fourth group of potentials in a vector quadrature relation to derive a potential representative of the product of said reciprocal and the future ground range of said target, combining the vertical component of said fourth group of potentials with a potential representative of the product of said reciprocal and the ballistic function potential representative of the distance above said target said gun must be pointed to compensate for the effect of gravity on said projectile to derive a potential representative of the product of said reciprocal and the virtual height of said target, and combining said last derived potential in vector quadrature with the potential representative of the product of said reciprocal and the future ground range to derive a potential representative of the product of said reciprocal and the slant distance from said gun to the future virtual position of said target and utilizing a potential representative of the product of said reciprocal and the future virtual height of said target and the potential representative of the product of said reciprocal and the future range of said target to determine the elevation gun pointing angle.

4. In a method of directing a projectile from a gun to a moving target, the steps which include generating potentials representative of ballistic functions which are defined as the reciprocal of the time of flight of said projectile and the product of said reciprocal and the distance above the target said gun must be pointed to compensate for the fall of said projectile due to gravity, generating a first group of potentials representative of the present position of the target in linear coordinates, generating a second group of potentials representative of the derivatives of said first group of potentials, generating a third group of potentials representative of the product of each of the first group of potentials and said potential representative of said reciprocal of the time of flight, combining said second and third groups of potentials to derive a fourth group of potentials representative of the product of said reciprocal and the future position of said target, combining the ground components of said fourth group of potentials in a vector quadrature relation to derive a potential representative of the product of said reciprocal and the future ground range of said target, combining the vertical component of said fourth group of potentials with a potential representative of the product of said reciprocal and the ballistic function potential representative of the distance above said target said gun must be pointed to compensate for the effect of gravity on said projectile to derive a potential representative of the product of said reciprocal and the virtual height of said target, and combining said last derived potential in vector quadrature with the potential representative of the product of said reciprocal and the future ground range to derive a potential representative of the product of said reciprocal and the slant distance from the gun to the future virtual position of said target and utilizing said ground component of said third group of potentials to determine the azimuth gun pointing angle.

5. The combination of means for producing potentials each proportional to the sum of the derivative of a different linear coordinate of the present position of a first moving object and said coordinate divided by the time of travel of a second object to be directed at said first object, means for generating potentials proportional to ballistic functions defined as the reciprocal of the time of travel of said second object and as the product of the reciprocal of said time of travel and the height above said first object said second object must be directed to establish contact therewith, means for combining the ground coordinate potentials of said sum potentials to derive the horizontal angle at which said second object must be directed to establish contact between said objects, means to derive from said latter named combining means a potential representative of the product of the ground range of said first moving object at a time when contact is to be established and the reciprocal of the time of travel, means for adding the elevation coordinate potential of said sum potentials with a potential representative of the product of said super height and said reciprocal, and means for combining said latter named derived potential and said latter named added potentials to determine the elevation angle at which said second object must be directed to establish said contact.

6. A system for directing a projectile from a gun to intercept a moving target comprising, in combination, means to generate potentials proportional to ballistic functions defined as the reciprocal of the time of travel of said projectile, and the product of said reciprocal and the height above the target said projectile must be directed to establish contact therewith, means to generate potentials proportional to the ground and elevation linear coordinates of the present position of said target, means to derive a differential potential from each of said ground and elevation linear coordinate potentials, means upon which said potential proportional to the reciprocal of time of travel is impressed to generate potentials proportional to the products of said ground and elevation potentials and said reciprocal potential, separate means to add each of said latter named product potentials to its associated differential potential to derive sum potentials, said means to add for said elevation coordinate product potential also including means to add said ballistic function product potential, first vario-coupler resolver means to which said linear coordinate ground sum potentials are applied to provide a mechanical displacement proportional to the azimuth angle to which said gun should be turned, said first vario-coupler resolver means having a separate winding means on its stator to derive a potential from said applied potentials proportional to the product of the ground range of said target at the time of interception by said projectile and said reciprocal, second vario-coupler resolver means to which said latter named derived potential and said elevation coordinate sum potential are applied to provide a mechanical displacement proportional to the elevation to which said gun should be pointed, said second vario-coupler resolver means having a separate winding means on its stator to derive a potential from said potentials applied to said second vario-coupler which is proportional to the product of the slant range of the target at the time of interception and said reciprocal, and means to impress said latter derived potential on said means to generate ballistic function potentials to control the potentials generated thereby.

7. The system recited in claim 6 wherein said means to generate ballistic functions potentials comprises a linear servo motor system responsive to said potential proportional to the product of the slant range of the target at the time of interception and said reciprocal of the time of flight of said projectile a first potentiometer having its movable arm driven by said servo motor shaft, the winding of said first potentiometer being tapered in accordance with the variation of the reciprocal of the time of flight of said projectile with the product of the slant range of said projectile and the reciprocal of the time of flight, and a second potentiometer having its movable arm driven by said servo motor shaft, the winding of said second potentiometer being tapered in accordance with the variation of the product of the super-height of said projectile and said reciprocal of the time of flight with the product of the slant range of said projectile and the reciprocal of the time of flight.

8. The system recited in claim 6 wherein said means to generate potentials proportional to the ground and elevation linear coordinates comprises a first linear potentiometer, means to impress a standard voltage on said potentiometer, means to position the movable shaft of said first potentiometer in accordance with the present slant range of said target to provide an output voltage proportional to said slant range, a first vario-coupler resolver having a stator winding and a rotor having two rotor windings disposed to provide quadrature fields, means to position said rotor in accordance with the present elevation of said target, means to impress said first linear potentiometer output voltage upon said stator winding to provide an output potential from one of said rotor windings proportional to the present ground range of said target, a second vario-coupler resolver having a stator winding and a rotor having two rotor windings disposed to provide quadrature fields, means to position said rotor in accordance with the present azimuth of said target, and means to impress said ground range potential on said stator winding to provide output potentials from said rotor windings proportional to said linear ground range coordinates.

9. The system recited in claim 6 wherein said means to generate potentials proportional to the product of the ground and elevation potentials and the reciprocal of the time of flight comprises a second linear potentiometer, means to couple said ballistics function potential generator means to said potentiometer to impress thereon said reciprocal of the time of flight potential, means to rotate said potentiometer movable arm proportional to said present target slant range whereby said potentiometer output potential is proportional to the product of said present slant range and said reciprocal, a third vario-coupler resolver having a stator winding and a rotor having two rotor windings disposed to provide quadrature fields, means to position said rotor in accordance with the present elevation of said target, means to impress said second potentiometer output on said stator winding to provide an output potential from one of said windings proportional to the product of the present elevation coordinate of said target and said reciprocal and an output potential from the other of said windings proportional to the product of the present target ground range and said reciprocal, a fourth vario-coupler resolver having a stator winding and a rotor including two rotor windings disposed to provide quadrature fields, means to position said rotor in accordance with the present azimuth of said target, and means to impress on said latter named stator said potential proportional to said product of the present target ground range and said reciprocal to provide output potentials from each of said rotor windings respectively proportional to the product of a different ground range linear coordinate and said reciprocal.

References Cited in the file of this patent

UNITED STATES PATENTS

| | | |
|---|---|---|
| 2,251,973 | Beale | Aug. 12, 1941 |
| 2,319,106 | Blackburn | May 11, 1943 |
| 2,382,994 | Holden | Aug. 21, 1945 |
| 2,408,081 | Lovell et al. | Sept. 24, 1946 |
| 2,428,800 | Holden | Oct. 14, 1947 |
| 2,465,624 | Agins | Mar. 29, 1949 |
| 2,467,646 | Agins | Apr. 19, 1949 |
| 2,475,314 | Dehmel | July 5, 1949 |